United States Patent
Diamant et al.

(10) Patent No.: US 10,733,498 B1
(45) Date of Patent: Aug. 4, 2020

(54) PARAMETRIC MATHEMATICAL FUNCTION APPROXIMATION IN INTEGRATED CIRCUITS

(71) Applicant: Amazon Technologies, Inc., Seattle, WA (US)

(72) Inventors: Ron Diamant, Albany, CA (US);
Sundeep Amirineni, Austin, TX (US);
Mohammad El-Shabani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 16/215,405

(22) Filed: Dec. 10, 2018

(51) Int. Cl.
| | |
|---|---|
| *G06F 17/17* | (2006.01) |
| *G06N 3/04* | (2006.01) |
| *G06F 17/11* | (2006.01) |
| *G06K 9/66* | (2006.01) |
| *G06K 9/00* | (2006.01) |

(52) U.S. Cl.
CPC .............. *G06N 3/04* (2013.01); *G06F 17/11* (2013.01); *G06F 17/17* (2013.01); *G06K 9/00973* (2013.01); *G06K 9/66* (2013.01)

(58) Field of Classification Search
CPC ............ G06F 17/17; G06F 17/11; G06N 3/04
USPC ........................................................ 708/230
See application file for complete search history.

(56) References Cited

U.S. PATENT DOCUMENTS

| | | | | |
|---|---|---|---|---|
| 2010/0293213 | A1* | 11/2010 | Jiang ...................... | G06F 17/17 708/270 |
| 2014/0279774 | A1* | 9/2014 | Wang ...................... | G06N 3/02 706/20 |
| 2019/0205736 | A1* | 7/2019 | Bleiweiss ................ | G06T 1/20 |

* cited by examiner

*Primary Examiner* — Tan V Mai
(74) *Attorney, Agent, or Firm* — Kilpatrick Townsend & Stockton LLP

(57) ABSTRACT

Methods and systems for supporting parametric function computations in hardware circuits are proposed. In one example, a system comprises a hardware mapping table, a control circuit, and arithmetic circuits. The control circuit is configured to: in a first mode of operation, forward a set of parameters of a non-parametric function associated with an input value from the hardware mapping table to the arithmetic circuits to compute a first approximation of the non-parametric function at the input value; and in a second mode of operation, based on information indicating whether the input value is in a first input range or in a second input range from the hardware mapping table, forward a first parameter or a second parameter of a parametric function to the arithmetic circuits to compute, respectively, a second approximation or a third approximation of the parametric function at the input value.

20 Claims, 18 Drawing Sheets

360a

| | x=0.5 | F(x) = 0.5 |
|---|---|---|
| p=0.8 | x=1 | F(x) = 1 |
| | x=1.5 | F(x) = 1 |
| | x=2 | F(x) = 1 |

⋮

360b

| | x=0.5 | F(x) = 0.5 |
|---|---|---|
| p=2 | x=1 | F(x) = 1 |
| | x=1.5 | F(x) = 1.5 |
| | x=2 | F(x) = 2 |

⋮

US 10,733,498 B1

PARAMETRIC MATHEMATICAL FUNCTION APPROXIMATION IN INTEGRATED CIRCUITS

BACKGROUND

Artificial neural networks are computing systems with an architecture based on biological neural networks. Artificial neural networks can be trained, using training data, to learn about how to perform a certain computing task.

A neural network may include a set of processing nodes. As part of a neural network computation, each processing node can process a piece of the input data based on a weight to generate an intermediate output. The intermediate outputs can be processed by an activation function to generate activation outputs, which can be further processed to generate a decision or an output. A mapping table can be used to approximation activation function processing, in which a plurality of inputs can be mapped to a plurality of candidate outputs, with each candidate output representing a result of performing activation function processing on an input. The activation function may be parametric to adapt the decision making of a neural network for different applications, which can improve operation flexibility. However, using a mapping table to support parametric activation function processing may lead to vastly expanding the mapping table to map the plurality of inputs to multiple sets of candidate outputs for different parametric variants of the parametric activation function, which increases not only the hardware resources required to store the mapping table but also the latency in accessing the mapping table.

BRIEF DESCRIPTION OF THE DRAWINGS

Various embodiments in accordance with the present disclosure will be described with reference to the drawings, in which.

DETAILED DESCRIPTION

Figure 1:
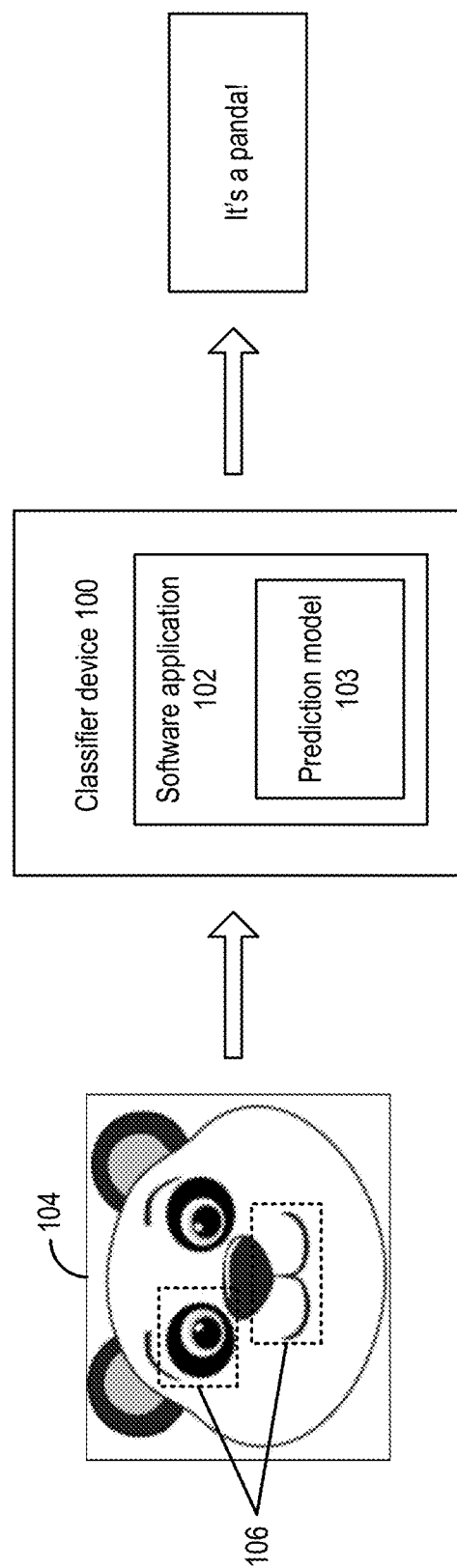
FIG. 1 illustrates an example a classifier device that uses techniques disclosed herein to process data.

Examples of the present disclosure relate to hardware circuits that implement a mathematical function, such as an activation function for neural network processing. In some examples, a system may include a hardware mapping table, control circuit, and arithmetic circuits. In a first mode of operation, the control circuit is configured to forward a set of parameters of a non-parametric function associated with an input value from the hardware mapping table to the arithmetic circuits to compute a first approximation of the non-parametric function at the input value. Moreover, in a second mode of operation, the control circuit is configured to, based on information indicating whether the input value is in a first input range or in a second input range from the hardware mapping table, forward a first parameter or a second parameter of a parametric function to the arithmetic circuits to compute, respectively, a second approximation or a third approximation of the parametric function at the input value.

An artificial neural network (hereinafter "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum to generate outputs of an intermediate layer. The computation of an intermediate output from activation function processing may represent making a decision with regard to the sum for example, whether the sum indicates certain a feature is found (or not found) in the input set. The intermediate outputs can be processed by subsequent intermediate layers or a subsequent output layer to generate a final output/decision of the artificial neural network with respect to the input set.

To improve the speed of neural network processing, the computations of an artificial neural network can be performed using hardware components, such as a neural network processor. The neural network processor can include a systolic array which includes arithmetic circuits to perform arithmetic operations for a neural network layer to generate the element-weight products and the sums of the element-weight products. The neural network processor may also include hardware circuitries, such as multiplexor circuitries configured as a mapping table or lookup table (LUT), to implement the activation function processing. For example, the lookup table can map a set of discrete candidate inputs (of an input range) to a set of discrete candidate outputs, with each candidate output representing a result of processing a corresponding candidate input with the activation function. A closest candidate input to an input can be determined, and a candidate output as an approximation of the activation function at the input can be selected from the LUT. The activation function approximation outputs (or the post-processed activation function approximation outputs) can be stored as outputs of the neural network layer, and can be provided to the systolic array as inputs for arithmetic operations of a next neural network layer.

Although a mapping table (or an LUT) that maps a set of discrete candidate inputs to a set of discrete candidate outputs enables reasonable efficient approximation of activation function processing, such an arrangement may be ineffective to provide approximation of a parametric activation function. At each neural network layer, the neural network may select one activation function within the group of activation functions to process intermediate outputs to generate the outputs for that neural network layer. But the mapping table needs to map the set of discrete candidate inputs to multiple sets of discrete candidate outputs, with each set of discrete candidate outputs representing a parametric variant of the parametric activation function. Such arrangements can vastly increase the size of the mapping table, which increases not only the hardware resources required to store the mapping table but also the latency in accessing the mapping table.

Examples of the present disclosure relate to hardware implementation of mathematical functions, such as activation functions, which can be used for neural network processing. In one example, an apparatus, such as a neural network processor, comprises a hardware mapping table, control circuit, and arithmetic circuits. In a first mode of operation, the control circuit is configured to forward a set of parameters of a non-parametric function associated with an input value from the hardware mapping table to the arithmetic circuits to compute a first approximation of the non-parametric function at the input value. Moreover, in a second mode of operation, the control circuit is configured to, based on information indicating whether the input value is in a first input range or in a second input range from the hardware mapping table, forward a first parameter or a second parameter of a parametric function to the arithmetic circuits to compute, respectively, a second approximation or a third approximation of the parametric function at the input value. In some examples, the control circuit can receive at least one of the first parameter or the second parameter via an overwrite instruction from an application that interfaces with the neural network processor.

Compared with the aforementioned lookup table approach, examples of the present disclosure do not require a mapping table to map a set of discrete candidate inputs to multiple sets of discrete candidate outputs for different parametric variants of a parametric activation function. Instead, the control circuit can receive an overwrite instruction including a parameter value corresponding to a parametric variant of the parametric activation function, and use the parameter value to approximate the parametric activation function. Such arrangements can remove the need for a huge mapping table to store candidate outputs for different parametric variants of the parametric activation function.

In addition, the hardware mapping table, control circuit, and the arithmetic circuits can be configured to support approximation of both non-parametric and parametric activation functions. For example, in the first mode of operation, the hardware mapping table can be programmed to store a set of parameters of the non-parametric activation function, which the control circuit can provide to the arithmetic circuits to perform computations for the approximation of the non-parametric activation function. Moreover, in the second mode of operation, the hardware mapping table can be programmed to store an indication of an input range for an input and, based on the indication, the control circuit can select between providing the first parameter or the second parameter to the arithmetic circuits to perform computations for the approximation of the parametric activation function. Such arrangements allow using the same set of hardware resources to perform, at different times, approximations of a non-parametric activation function and approximations of a parametric activation function. As a result, operational flexibility can be enhanced, while the size and the power consumption of the neural network processor can also be reduced.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow trade-off between speed and precision of operating prediction model 103, as to be discussed below.

Figure 2A:
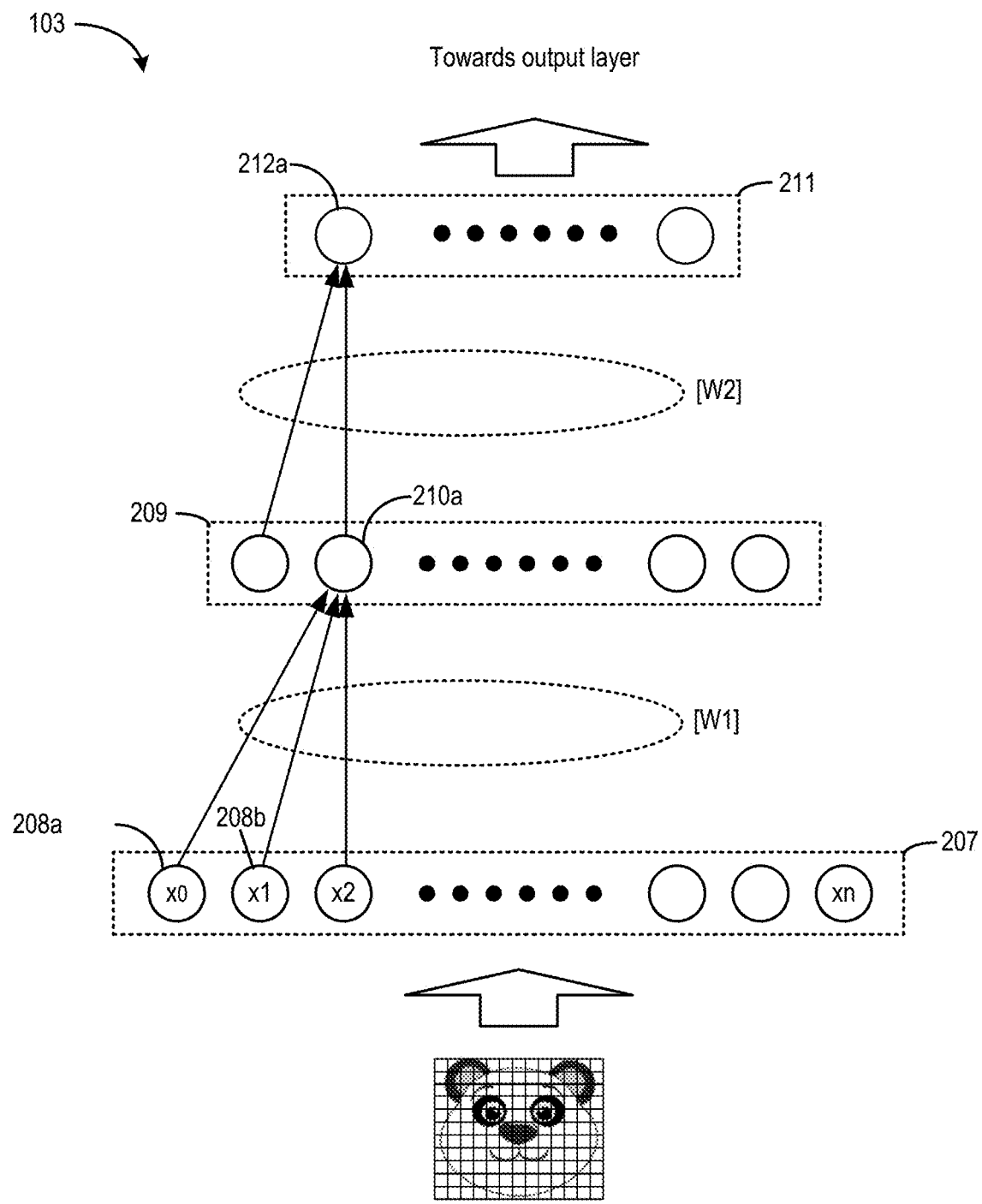
FIGS. 2A and 2B are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1).

Figure 2B:
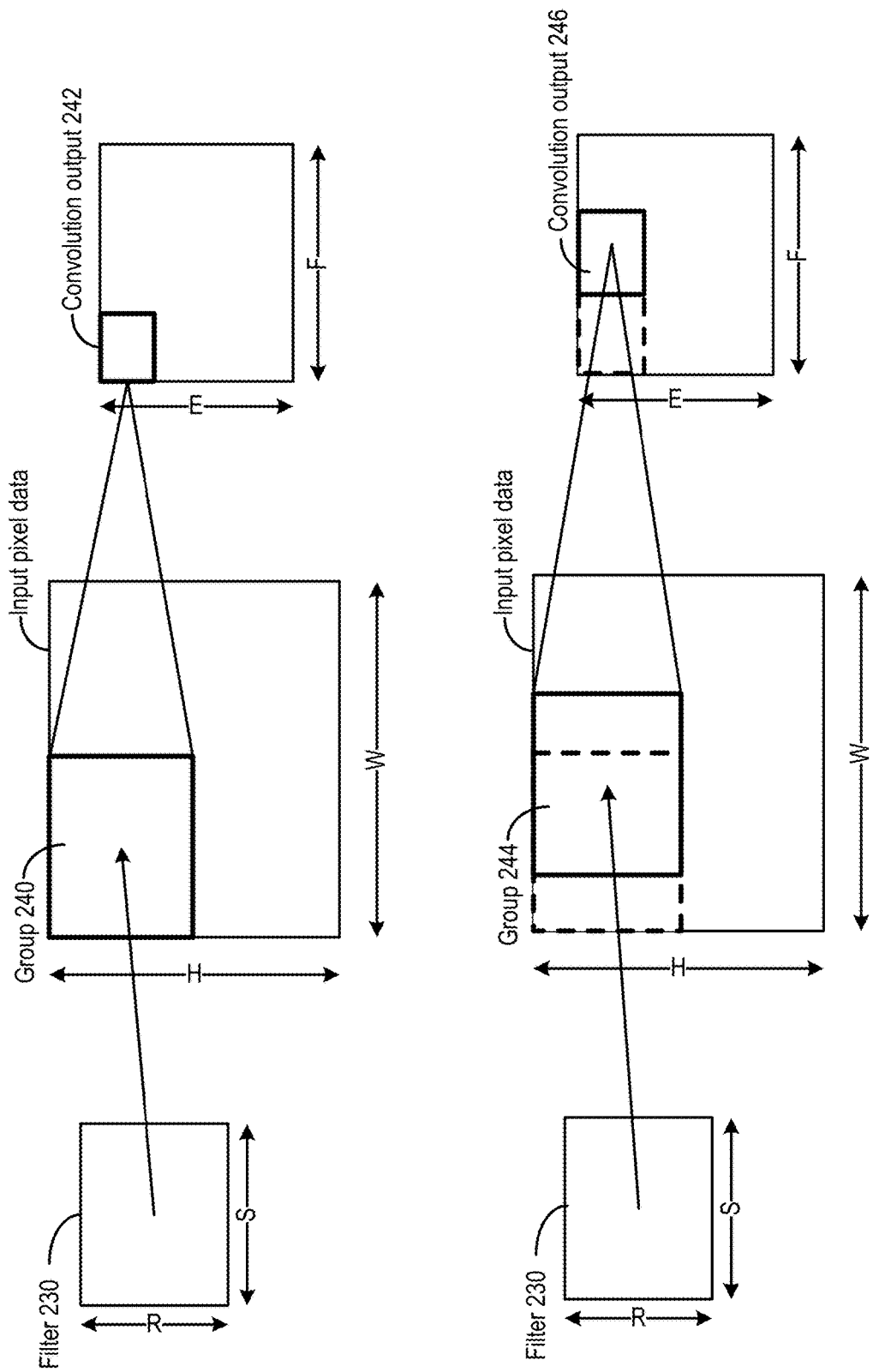

In a case where prediction model 103 is a CNN, each processing node of layer 209 may generate the sum based on the scaling of pixel values from a group of processing nodes of layers 207. The sum may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tan h), an arc tangent function (arctan), a sigmoid function, a Gaussian function, etc.

A processing node of layer 209 (e.g., processing node 210a) may process the sum with the ReLU function to generate a first intermediate output based on the following equation:

$$\text{first\_intermediate\_output}_{210a} = ReLU(Sum_{210a}) \quad \text{(Equation 3)}$$

In some examples, prediction model 103 may include a pooling layer (not shown in FIG. 2A) to perform a pooling operation to reduce the size of the first intermediate outputs. For example, the pooling layer may perform a max pooling operation and forward a maximum intermediate output among a group of the first intermediate outputs (while discarding the rest of the intermediate outputs in the group) to layer 211. As another example, the pooling layer may perform an average pooling operation and forward an average intermediate output among the group of the first intermediate outputs to layer 211. In some examples, the pooling operation is not performed, and the first intermediate outputs are forwarded directly to layer 211.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

As described above, a neural network computation may include multiplication and summation computations to compute weighted sums (e.g., Equation 1), followed by activation function processing (Equations 2 and 3) on the weighted sums. As a trade-off between accuracy and speed of computation, the activation function processing of a weighted sum can be approximated using extrapolation. Multiple sets of function parameters of an activation function can be pre-computed for different base values and stored in a mapping table. To approximate activation function processing of an input, a set of function parameters of which the base value is closest to the input can be selected from the mapping table. The set of function parameters can then be fed to arithmetic circuits to perform extrapolation computations.

Figure 3A:
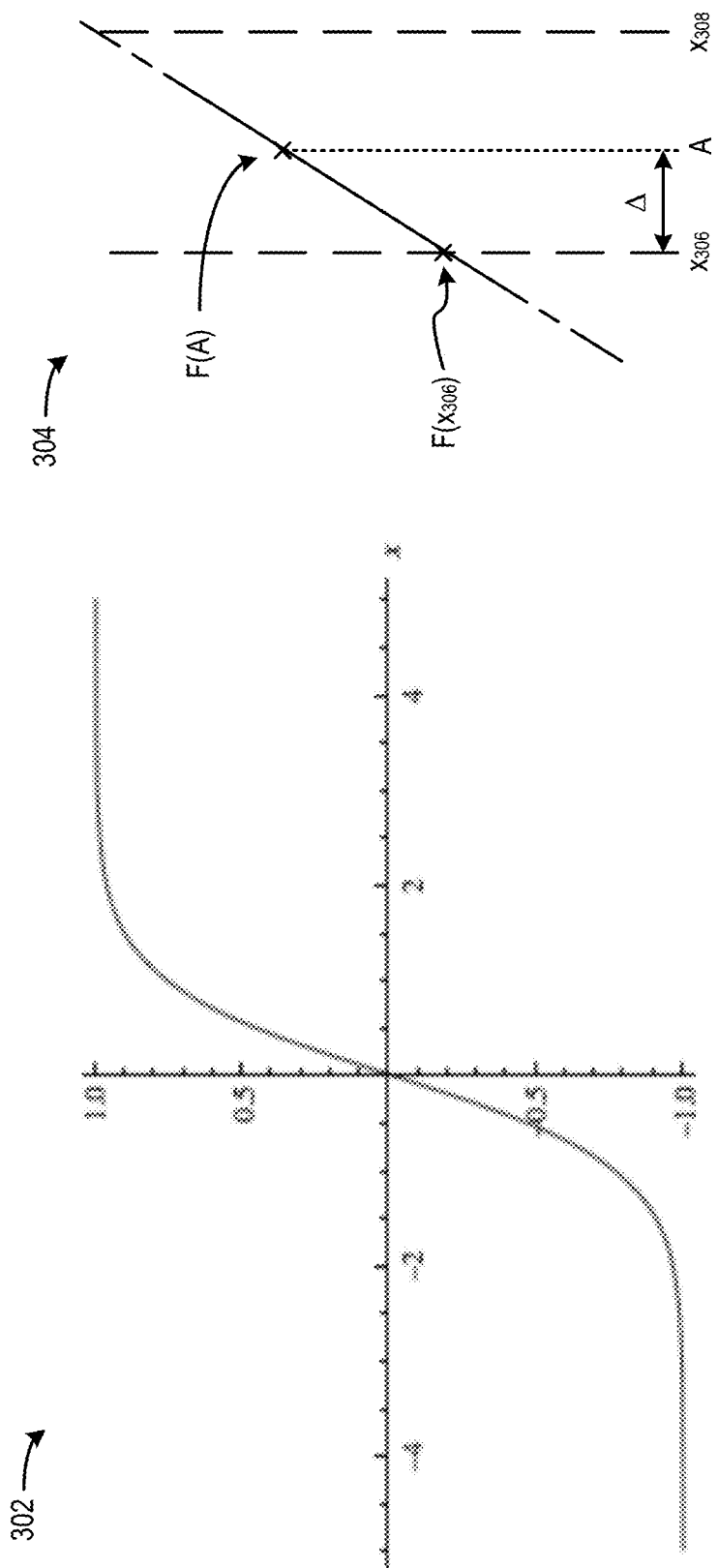
FIGS. 3A-3E illustrate computation operations for implementing the prediction model of FIGS. 2A-2B, according to certain aspects of the present disclosure.

FIG. 3A illustrates an example of an activation function. Graph 302 on the left illustrates an example of a sigmoid function F(x) which can be used as an activation function. Sigmoid function F(x) can be defined according to the following equation:

$$F(x) = \frac{e^x}{1 + e^x} \quad \text{(Equation 4)}$$

In Equation 4, $e^x$ refers to an exponential function. The sigmoid function can accept an infinite input range, but as shown in FIG. 3A, for an input larger than 3 or less than −3, the output of the sigmoid function is essentially flat and does not change with the input.

Figure 3B:
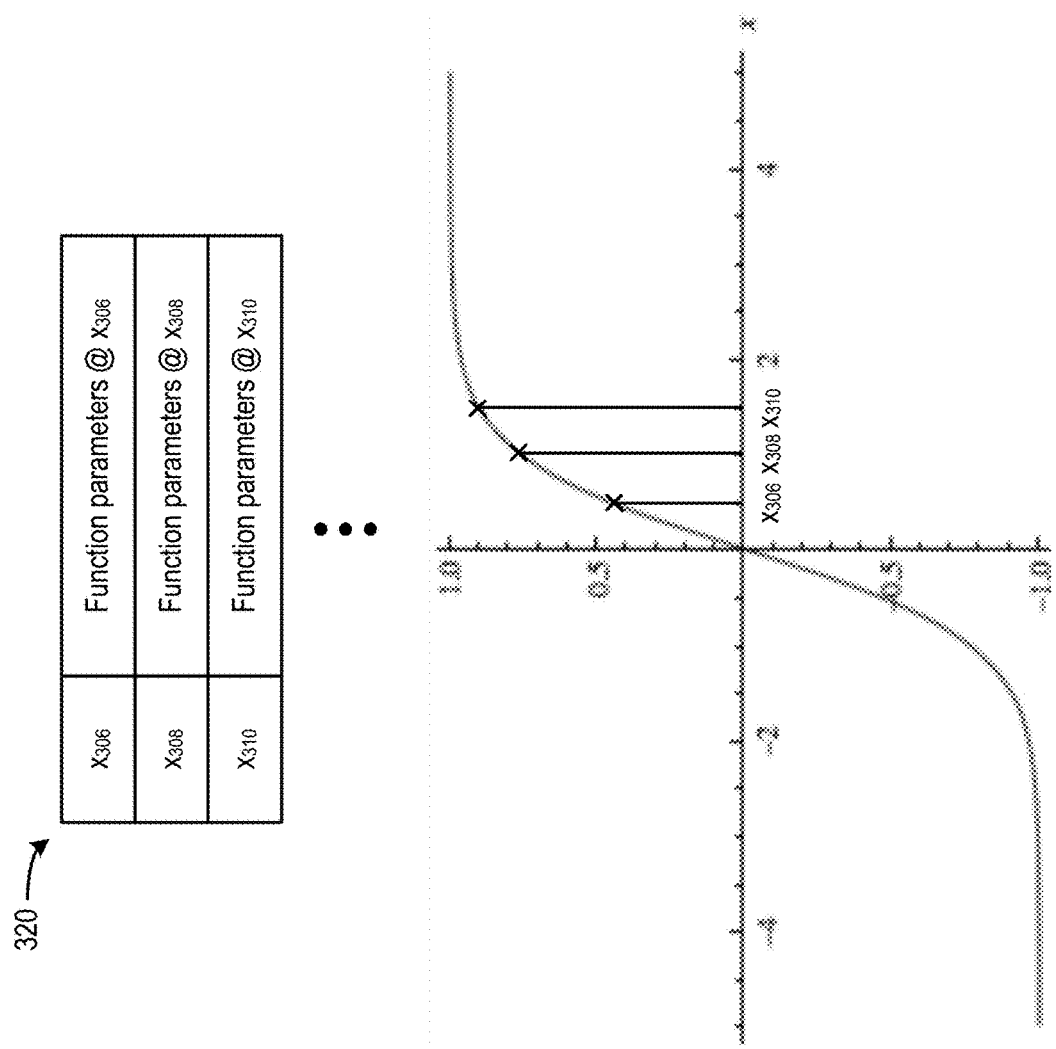
Figure 3C:
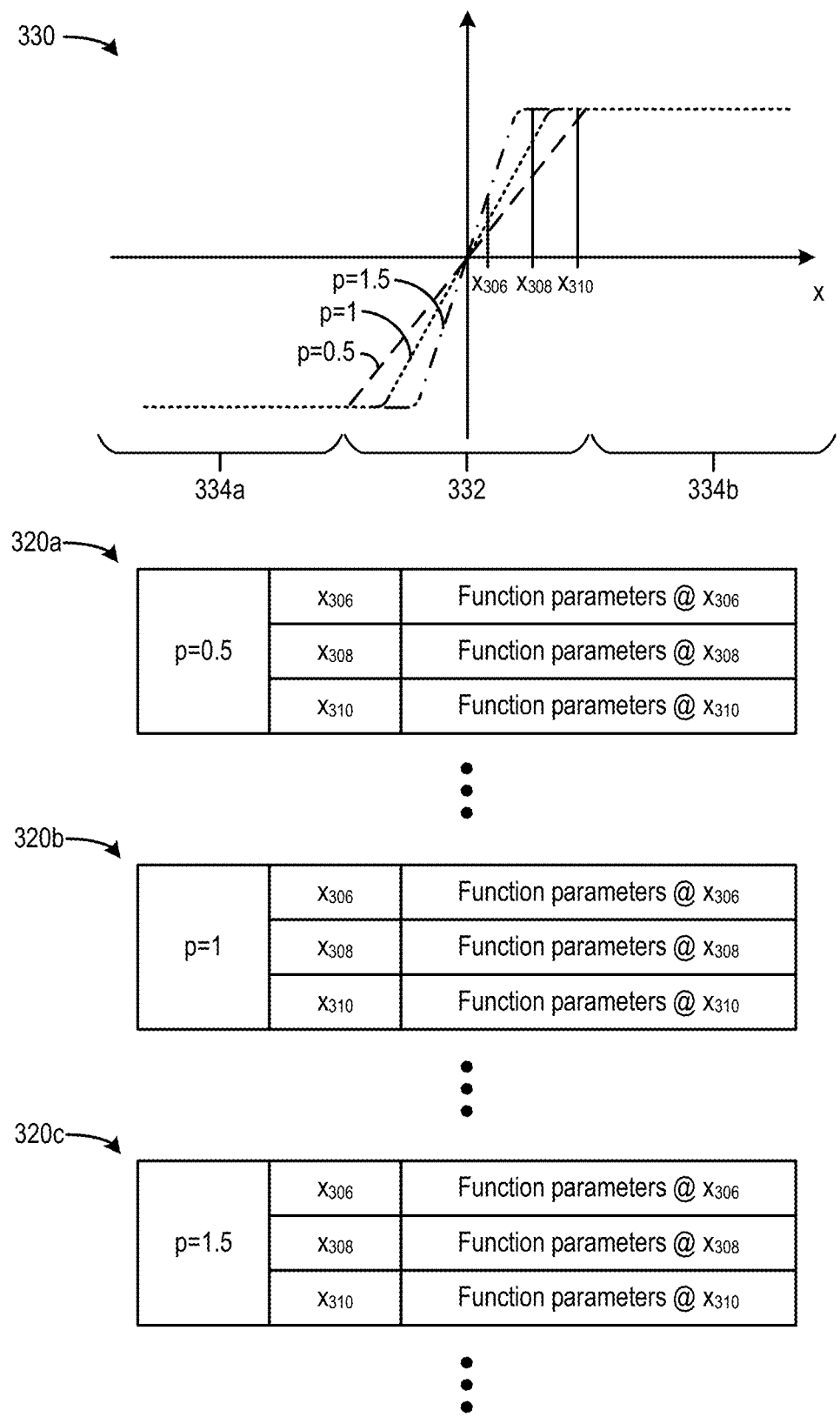

Graph 304 of FIG. 3C illustrates an example process of extrapolation to estimate the value of F(x) at input A. As shown in graph 304, two boundary values (denoted as "$x_{306}$" and "$x_{308}$") that define an input subrange including an input A can be determined. The value of F(x) at input A can be extrapolated from the value of F(x) at one of boundary values $x_{306}$ or $x_{308}$ which acts as a base value. To support the extrapolation, multiple sets of function parameters, such as function F(x) evaluated at different base values (including $x_{306}$, $x_{308}$, $x_{310}$, etc.) can be precomputed and stored in a mapping table. FIG. 3B illustrates an example of a mapping table 320 that maps each base value to a set of function parameters, which may include slopes, Taylor series expansion coefficients, etc. To perform extrapolation, a difference Δ between input A and each of the base values (e.g., $x_{306}$, $x_{308}$, $x_{310}$, etc.) can be determined, and the base value closest the input A (e.g., $x_{306}$) can also be selected. A set of function parameters mapped to the closest base value can be retrieved from mapping table 320.

In a case where the set of function parameters comprises Taylor series expansion coefficients, the value of F(x) at input A can be approximated based on a Taylor series expansion based on the following equation:

$$\text{Approx. } F(A) = F(x_{306}) + \sum_{n=1}^{\infty} \left( \frac{S^n(x_{306})}{n!} \times \Delta^n \right) \quad \text{(Equation 5)}$$

In Equation 5, "n!" represents a factorial of n, "$F''(x_{306})$" represents an n-th degree derivative of F(x) evaluated at input boundary value $x_{306}$, whereas $\Delta^n$ refers to raising the difference (between input A and input boundary value $x_{306}$) to the power n.

In some examples, a Taylor series expansion up to the third degree (n=3) may provide sufficient accuracy in approximating the value of F(A) (the value of F evaluated at input A). Equation 5 can be rewritten as follows:

$$\text{Approx. } F(A) = \quad \text{(Equation 6)}$$
$$F(x_{306}) + F^1(x_{306}) \times \Delta + \frac{F^2(x_{306})}{2} \times \Delta^2 + \frac{F^3(x_{306})}{6} \times \Delta^3$$

Equation 6 can be further rewritten as follows:

$$\text{Approx. } F(A) = \quad \text{(Equation 7)}$$

$$F(x_{306}) + \left(\left(\frac{F^3(x_{306})}{6} \times \Delta + \frac{F^2(x_{306})}{2}\right) \times \Delta + F^1(x_{306})\right) \times \Delta$$

In some examples, the sigmoid function F(x) can be parametrized to improve the flexibility in the activation function processing. Various aspects of the sigmoid function can be parametrized. For example, the slope of sigmoid function F(x), as well as the input range for which the slope of F(x) is non-zero, can be adjusted to process different input sets, for different neural network layers, and/or for different stages of neural network processing (e.g., training versus influencing), which adds flexibility to the activation function processing. A parametric sigmoid function G(x) with a parametric slope can be defined according to the following equation:

$$G(x) = \frac{e^{px}}{1 + e^{px}} \quad \text{(Equation 8)}$$

In Equation 8, the exponent of the exponential function $e^x$ of F(x) of Equation 4 is scaled by a parameter p. Graph 330 of FIG. 3C illustrates a family of functions G(x) with different values for the parameter p. Each function G includes a parametric portion 332 (where the slope changes with parameter p) and non-parametric portions 334a and 334b (where the function saturates at −1 and +1 and the slope becomes flat). In some examples, to support an extrapolation operation of G(x), multiple copies of mapping tables 320 (e.g., mapping tables 320a, 320b, 320c, etc.) can be maintained, with each mapping table storing a set of function parameters of a parametric variant of G(x) mapped to a set of base values (e.g., $x_{306}$, $x_{308}$, $x_{310}$, etc.). For example, mapping table 320a can store a set of function parameters (e.g., Taylor series coefficients, slope, etc.) of G(x) having parameter p equal to 0.5, mapping table 320b can store a set of function parameters of G(x) having parameter p equal to 1, whereas mapping table 320c can store a set of function parameters of G(x) having parameter p equal to 1.5. As the number of the parametric variants of G(x) to be supported increases, the number of mapping tables 320 can also increase. As a result, both the hardware resources required to store the mapping tables and the latency in accessing the mapping tables increase.

Figure 3D:
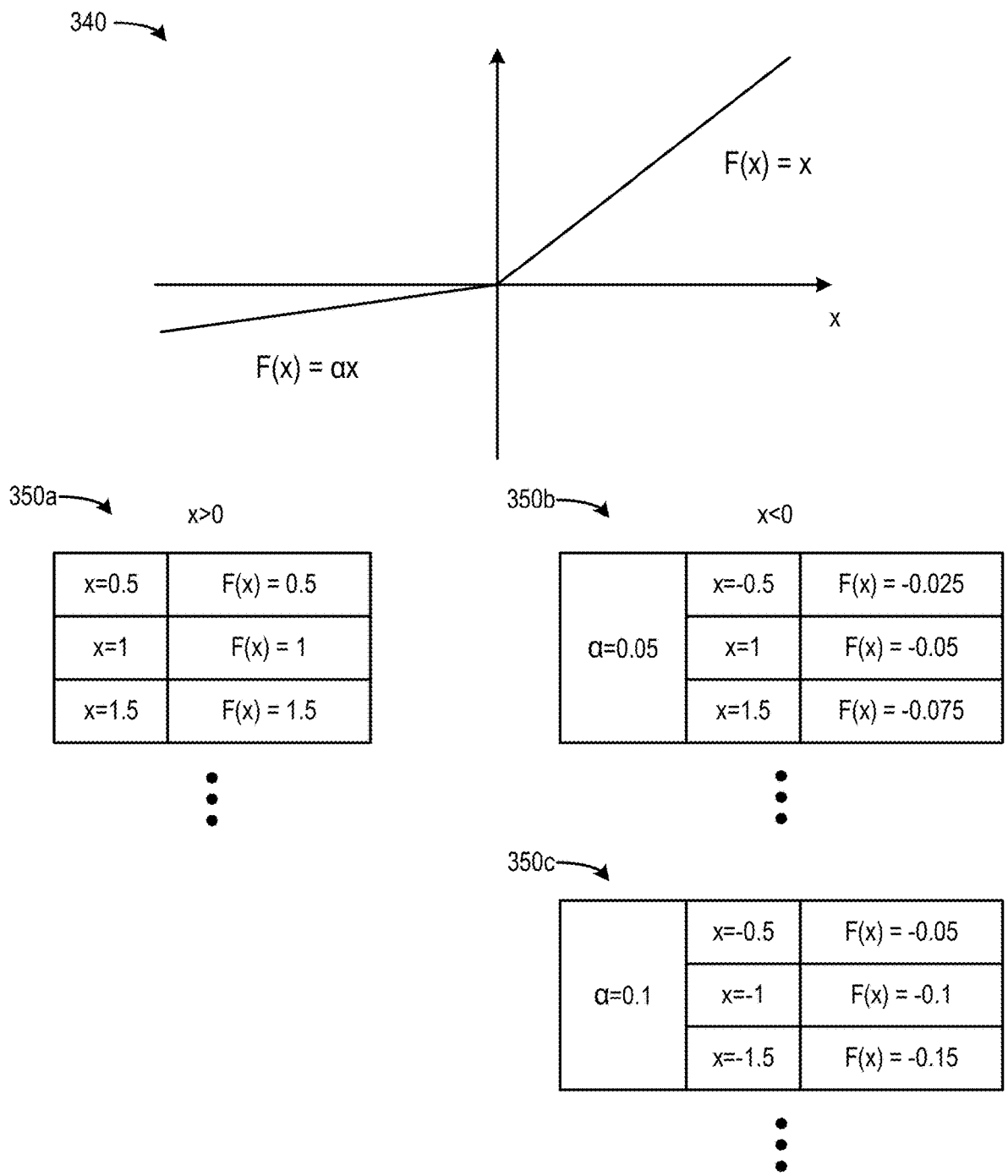

FIG. 3D illustrates another example of an activation function. Graph 330 illustrates an example of a parametric ReLU function H(x). Parametric ReLU function H(x) can be defined according to the following equation:

$$H(x) = \begin{cases} x, & x \geq 0 \\ \alpha x, & x < 0 \end{cases} \quad \text{(Equation 9)}$$

As shown in Equation 9 and in FIG. 3D, parametric ReLU can include a non-parametric portion and a parametric portion. For example, the portion of H(x) for non-negative input (x≥0) is non-parametric, and the output of a parametric ReLU function can be equal to the input. In contrast, the portion of H(x) for negative input is parametric, and the output of the parametric ReLU function can be equal to the input scaled by a scaling factor α which can be parametric. Compared with a non-parametric ReLU function as shown in Equation 2, the output for the function for negative input is no longer always zero but can be adjusted by scaling factor α. Parametric ReLU allows the handling of negative input to be adapted for different input sets, for different neural network layers, and/or for different stages of neural network processing (e.g., training versus influencing), which also adds flexibility to the activation function processing. Moreover, in contrast to non-parametric ReLU where a processing node will output zero for a negative input and hence does not contribute to the decision output of the neural network layer, parametric ReLU allows each processing node to generate non-zero outputs to contribute to the decision output of the neural network layer even for negative inputs. Such arrangements allow a decision to be made based on outputs of more processing nodes, which can improve the accuracy of the activation function processing.

In some examples, to support an extrapolation operation of H(x), multiple mapping tables 350 (e.g., mapping tables 350a, 350b, 350c, etc.) can be maintained. Mapping table 350a can store the function parameters of H(x) for non-negative inputs, whereas mapping tables 350b and 350c can store the function parameters of different parametric variants of H(x) for negative inputs. For example, mapping table 350b can store the function parameters of H(x) having scaling factor α of 0.05, whereas mapping table 350b can store the function parameters of H(x) having scaling factor α of 0.1. As the number of the parametric variants of H(x) to be supported increases, the number of mapping tables 350 can also increase. As a result, both the hardware resources required to store the mapping tables and the latency in accessing the mapping tables increase.

FIG. 3D illustrates another example of an activation function. Graph 360 illustrates an example of a parametric capped ReLU function K(x). K(x) can be defined according to the following equation:

$$K(x) = \begin{cases} p, & x \geq p \\ x, & p > x \geq 0 \\ 0, & x < 0 \end{cases} \quad \text{(Equation 10)}$$

Figure 3E:
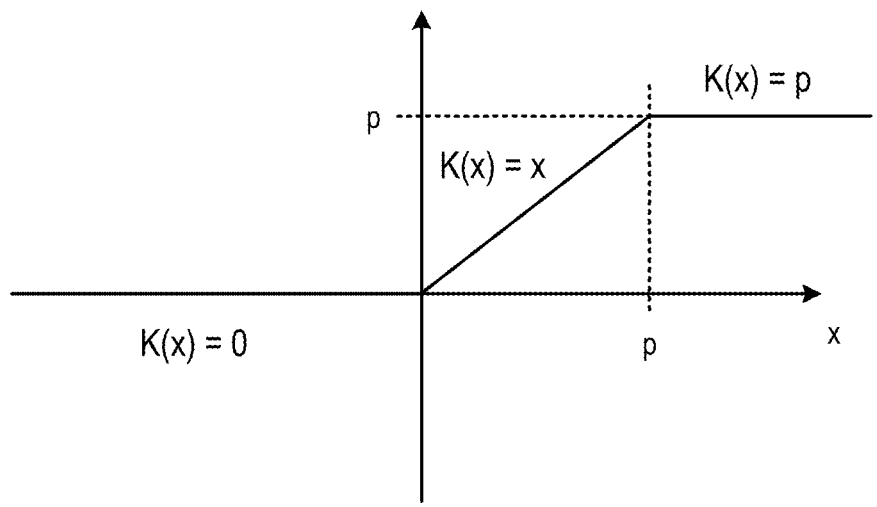

As shown in Equation 10 and in FIG. 3E, K(x) includes a parametric portion and a non-parametric portion. The non-parametric portion of K(x) can correspond to an input range that is below a cap value p. The output of parametric capped ReLU function K(x) can be equal to zero if the input is negative, and can be equal to the input (x) if the input is non-negative, up to the cap value p. For input equal to or above p, the output of the function is capped at p. The cap value p can be parametric. Compared with a non-parametric ReLU function as shown in Equation 2, the maximum output for the function for non-negative input can be adjusted. Parametric ReLU allows the handling of strong positive input to be adapted for different input sets, for different neural network layers, and/or for different stages of neural network processing (e.g., training versus influencing), which also adds flexibility to the activation function processing. For example, the maximum output can be adjusted to encourage learning of sparse features. All these can improve the accuracy of the activation function processing.

In some examples, to support an extrapolation operation of K(x), multiple mapping tables 360 (e.g., mapping tables 360a, 360b, etc.) can be maintained. Mapping table 360a can store the function parameters of K(x) for cap value p equal to 1, whereas mapping table 360b can store the function parameters of K(x) for cap value p equal to 2. As the number of the parametric variants of K(x) to be supported increases, the number of mapping tables 360 can also increase. As a result, both the hardware resources required to store the mapping tables and the latency in accessing the mapping tables increase.

Figure 4A:
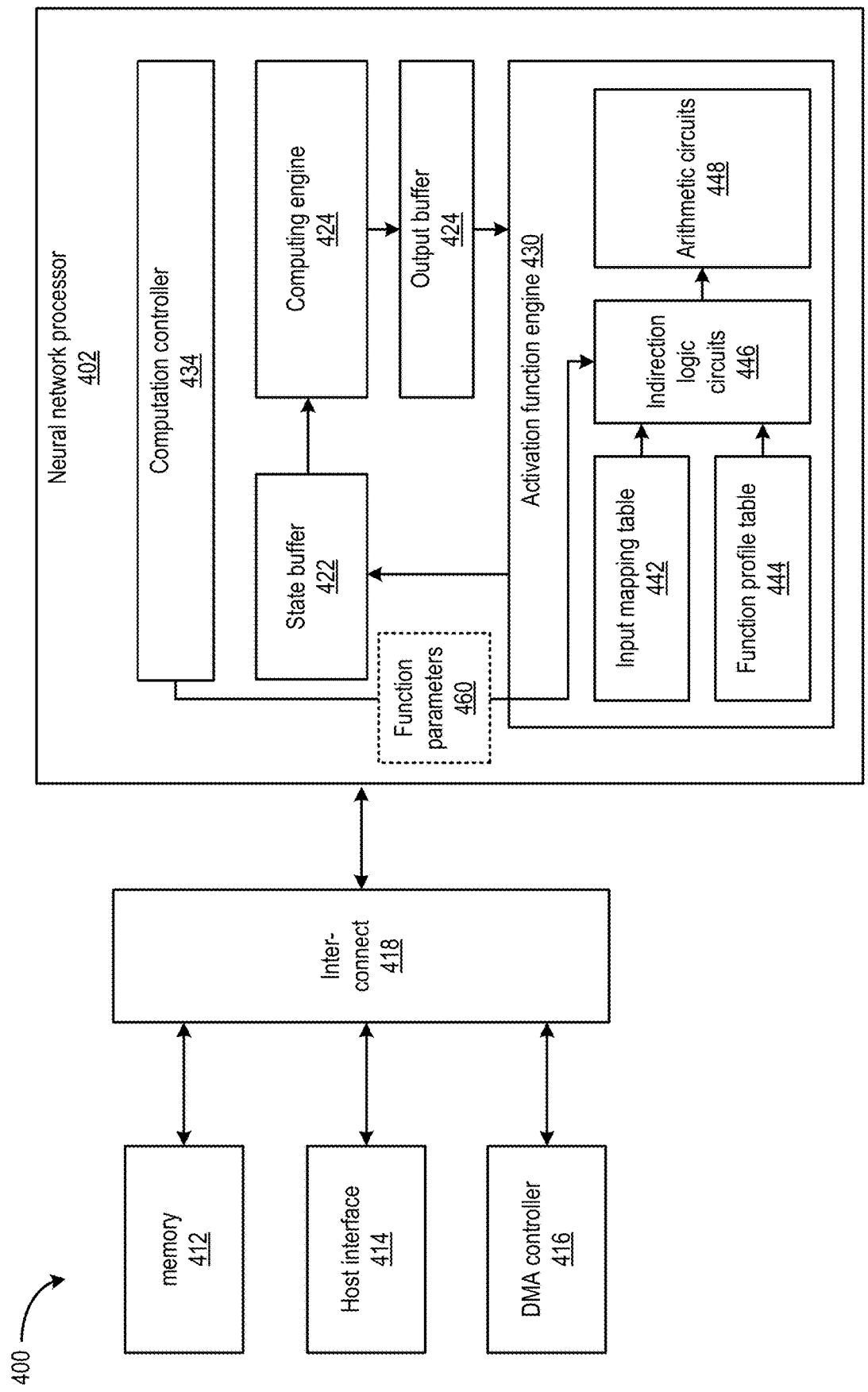
FIGS. 4A-4B illustrate an example neural network processor comprising an example activation function engine, according to certain aspects of the present disclosure.

FIG. 4A shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4A) to provide computing and memory resources for a computing service. For example, referring back to FIG. 1, apparatus 400 may provide computing and memory resources for computations with prediction model 103. A host device can operate software application 102 and communicate with apparatus 400 to perform one or more image recognition tasks based on computations with prediction model 103. The host device may transmit multiple image data sets associated with multiple contexts, and provide the multiple image data sets to apparatus 400, which can generate multiple outputs to predict, for example, whether each of the multiple image data sets includes a predetermined object.

In the example of FIG. 4A, apparatus 400 may include a neural network processor 402 coupled to memory 412, a direct memory access (DMA) controller 416, and a host interface 414 via an interconnect 418. As to be discussed in more detail, neural network processor 402 can provide the computing resources to support the computations with prediction model 103. Neural network processor 402 can include an integrated circuit such as, for example, a System-on-Chip (SoC). Memory 412 may be configured to store the instructions, input data (e.g., pixel groups 249 and 244 of FIG. 2B) and the weights (e.g., filter 230) received from the host device. Memory 412 may also be configured to store the output of neural network processor 402 (e.g., convolution outputs 242 and 246 of FIG. 2B). Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data, and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with one or more instances of prediction model 103. As shown in FIG. 3A, neural network processor 402 may include a state buffer 422, a computing engine 424, an output buffer 428, an activation function engine 430, and a computation controller 434.

State buffer 422 can provide caching of data used for computations at computing engine 424. The data cached at state buffer 422 may include, for example, the input data, weights, and biases acquired from memory 412, as well as intermediate outputs of computations at computing engine 424. The caching can reduce the effect of memory access bottleneck (e.g., caused by the latencies at memory 412, DMA controller 416, interconnect 418, etc.) on the performance of computing engine 424. State buffer 322 can be an on-chip memory device and may include, for example, static random access memory (SRAM).

State buffer 422 can be controlled by computation controller 430 to fetch weights, bias, and input data to computing engine 424. Computing engine 424 can perform neural network computations based on the weights, bias, and input data to generate weighted sums. Computing engine 424 may include a set of circuitries configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. The weighted sums can be collected and accumulated at output buffer 428 to generate intermediate output data. Output buffer 428 can provide the intermediate output data to activation function engine 430 to perform activation function processing to generate the outputs of a neural network layer. The outputs can be stored in state buffer 422, which can fetch the outputs, as well as a new set of weights and bias, to computing engine 424 to perform neural network computations for the next neural network layer.

Activation function engine 430 can compute approximation results of the activation function processing of the intermediate output data accumulated at output buffer 428. Activation function engine 430 can be controlled by computation controller 434 to operate in one or two modes. In a first mode of operation, activation function engine 430 can perform extrapolation computations for a non-parametric activation function. In a second mode of operation, activation function engine 430 can perform computations for a parametric activation function, and the computations may or may not include extrapolation operations. Activation function engine 430 may include an input mapping table 442, a function profile table 444, an indirection logic circuit 446, and arithmetic circuits 446 to approximate activation function processing.

Figure 4B:
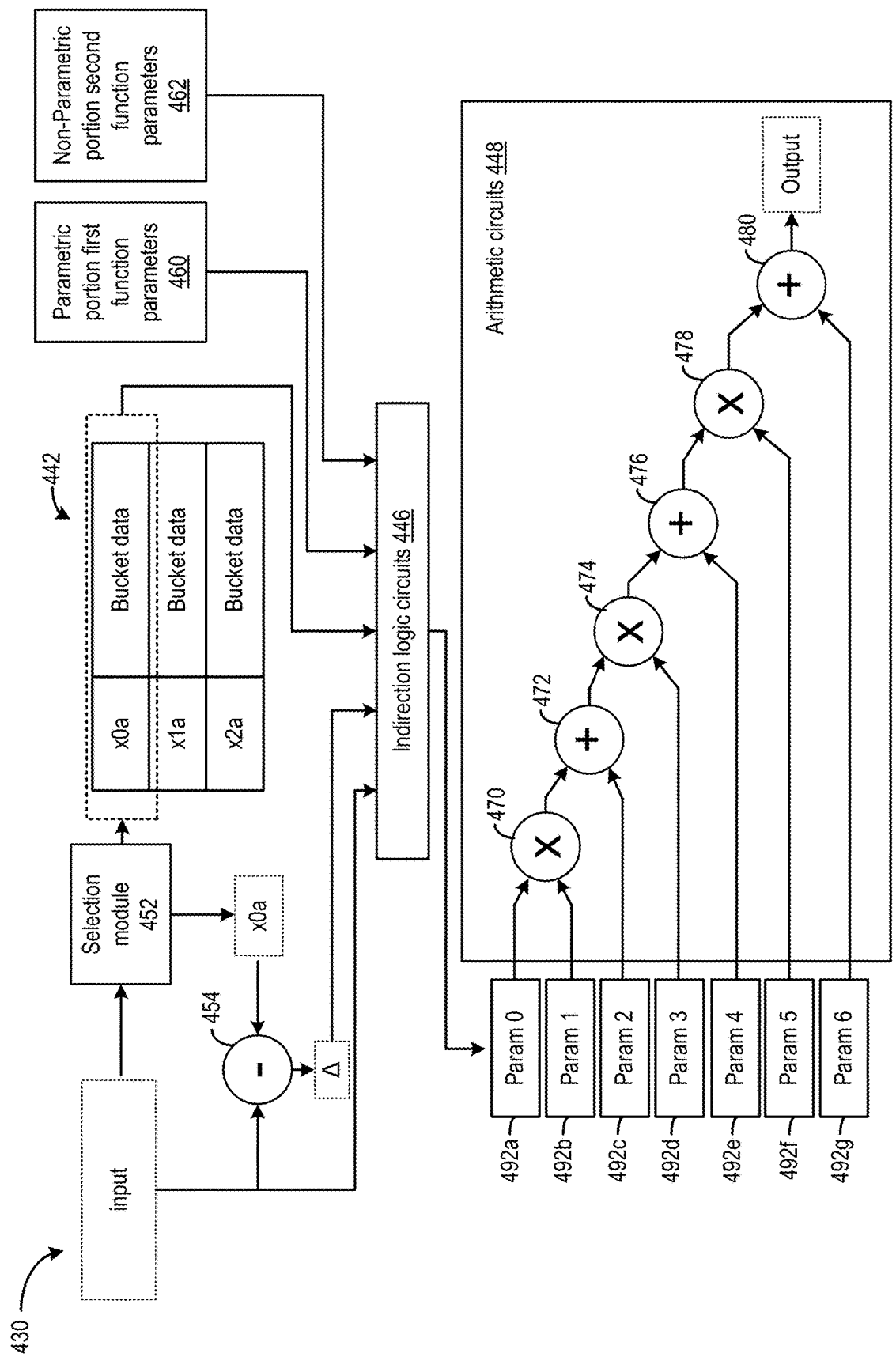

FIG. 4B illustrates additional details of activation function engine 430. As shown in FIG. 4B, input mapping table 442 may include a set of buckets, with each bucket being associated with a base value (e.g., x0a, x1a, x2a, etc.). The base values stored in input mapping table 442 can represent an input range for an activation function. Each bucket of input mapping table 442 can store different bucket data depending on an operation mode of activation function engine 430. In the first mode of operation where non-parametric activation function processing is to be performed, each bucket can store a set of function parameters such as slope, Taylor series coefficients, etc. evaluated at the base value. Activation function engine 430 further includes a selection module 452 that can select a bucket for an input (e.g., based on the base value of the bucket being closest to the input), and a subtractor 454 to compute a difference Δ between the input and the base value. Indirection logic circuits 446 can forward the function parameters stored in the selected bucket as well as difference Δ to arithmetic circuits 448, which can include a set of adders and multipliers to perform extrapolation computations based on, for example, Equations 6 and 7.

Moreover, in the second mode of operation where parametric activation function processing is to be performed, each bucket of input mapping table 442 can store an indication of whether the base value corresponds to a parametric portion of the parametric function or a non-parametric portion of the parametric function. A bucket including the indication can be selected based on the input, and indirection logic circuits 446 can, based on the indication, forward either first function parameters 460 of the parametric portion or second function parameters 462 of the non-parametric portion to arithmetic circuits 448. Indirection logic circuits 446 can also forward the difference Δ or the input to arithmetic circuits 448 to compute a result of activation function processing based on the first function parameters or the second function parameters.

Function profile table 444 can store second function parameters for the non-parametric portions of parametric activation functions. For example, referring to Equation 8 and FIG. 3C, function profile table 444 can store the saturation values of G(x) (which can be −1 and +1). Moreover, referring to Equation 9 and FIG. 3D, function profile table 444 can store a scaling constant of 1 to scale an input (x) for the non-parametric portion of H(x). Further, referring to Equation 10 and FIG. 3E, function profile table 444 can store scaling constants of 1 (to scale a non-negative input (x) up to the cap value) and 0 (to scale a negative input (x)) for the non-parametric portion of K(x). The second function parameters can be mapped with identifiers of different parametric activation functions in function profile table 444. To perform computation for a parametric activation function, function profile table 444 can receive an identifier of the parametric activation function and retrieve the second function parameters for the parametric activation function based on the identifier. The retrieved second function parameters can be forwarded to indirection logic circuits 446, which can forward the second function parameters as the second function parameters to arithmetic circuits 448 if approximation of the parametric activation function is to be performed, and if the input corresponds to the non-parametric portion of the parametric activation function.

Indirection logic circuits 446 includes logic circuits to selectively forward function parameters to arithmetic circuits 448 to perform computations for activation function approximation. Specifically, when activation function engine 430 operates in the first operation mode to approximate a non-parametric activation function, indirection logic circuits 446 can receive function parameters of the non-parametric activation function from input mapping table 442, and forward the function parameters to arithmetic circuits 448 to perform extrapolation computations, as described above. Moreover, when activation function engine 430 operates in the second operation mode to approximate a parametric activation function, indirection logic circuits 446 can receive first function parameters 460 of a parametric portion of the parametric activation function and second function parameters 462 of a non-parametric portion of the parametric activation function, and selectively forward one of first function parameters 460 or second function parameters 462 to arithmetic circuits 448 to approximate either the parametric portion or the non-parametric portion of the parametric activation function.

In some examples, indirection logic circuit 446 can receive first function parameters 460 from computation controller 434, which can receive first function parameters 460 from an application that interfaces with neural network processor 402 (e.g., software application 102). The application can transmit function parameters 460 as part of an overwrite instruction to set the parametric portion of the parametric activation function to computation controller 434, which can then forward first function parameters 460 to indirection logic circuit 446. In addition, indirection logic circuits 446 can receive second function parameters 462 of the non-parametric portion of the parametric activation function from function profile table 444. Indirection logic circuit 446 can also receive, from input mapping table 442 based on the input, an indication of whether the input corresponds to the parametric portion or the non-parametric portion of the parametric activation function. If the indication signals that the input corresponds to the parametric portion, indirection logic circuit 446 can forward first function parameters 460 to arithmetic circuits 448 to perform computations to approximate the parametric portion. If the indication signals that the input corresponds to the non-parametric portion, indirection logic circuit 446 can forward second function parameters 462 to arithmetic circuits 448 to perform computations to approximate the non-parametric portion. Through the selective forwarding of function parameters by indirection logic circuit 446, approximations of the parametric activation function across the entire input range can be performed.

Arithmetic circuits 448 can include a set of adders and multipliers to perform computations to approximate an activation function. As shown in FIG. 4B, arithmetic circuits 448 include a first multiplier 470, a first adder 472, a second multiplier 474, a second adder 476, a third multiplier 478, and a third adder 480. Arithmetic circuits 448 can receive input parameters 492a-492g, which can include one of difference Δ or the input, and one of function parameters for a non-parametric function, first function parameters 460 of the parametric portion of a parametric function, or second function parameters 462 of the non-parametric portion of the parametric function, to perform computations to approximate activation function processing of the input.

Figure 5A:
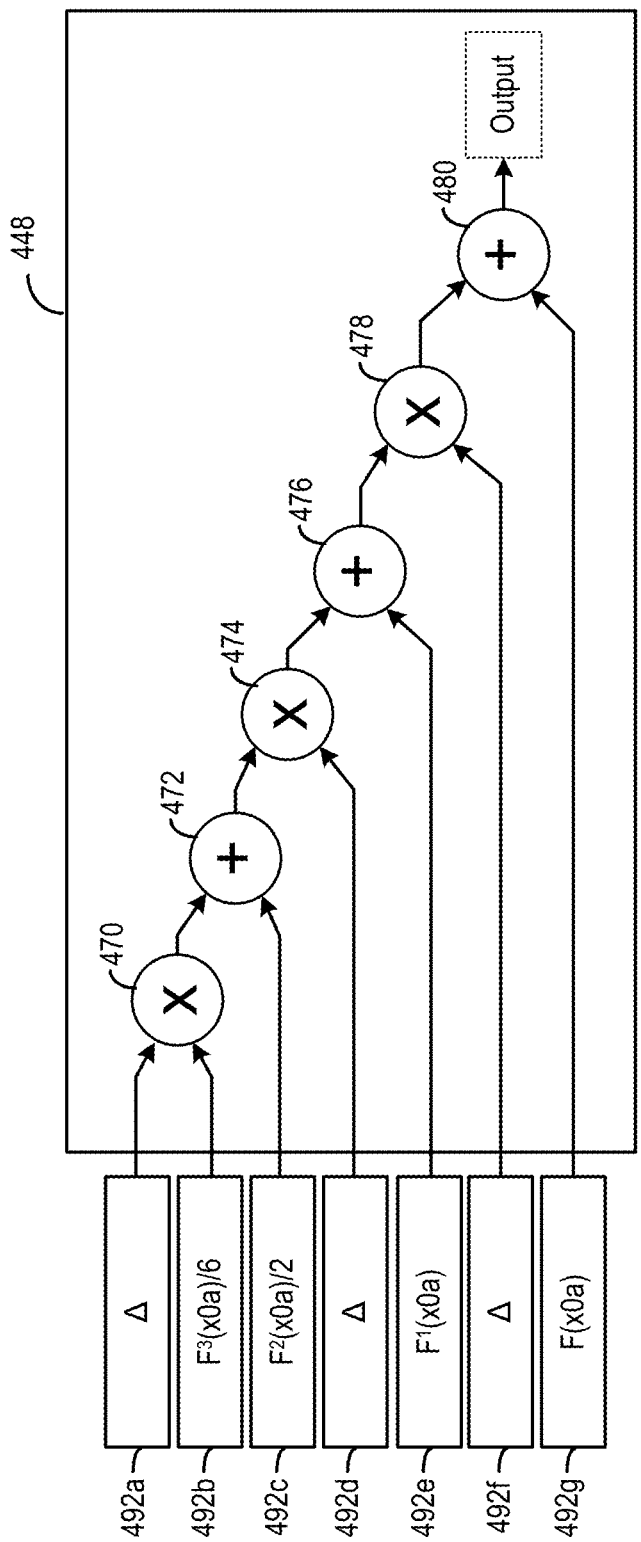
FIGS. 5A-5E illustrate examples of operations of the activation function engine of the example neural network processor of FIGS. 4A-4B, according to certain aspects of the present disclosure.

FIG. 5A-FIG. 5E illustrate various examples of input parameters 492a-492g provided to arithmetic circuits 448 to compute approximations of different activation functions. In FIG. 5A, arithmetic circuits 448 can be configured to perform an extrapolation operation based on Taylor series coefficients of non-parametric sigmoid function F(x) of FIG. 3B. To perform the extrapolation operation, indirection logic circuits 446 can forward difference Δ as input parameters 492a, 492d, and 492f. Moreover, assuming the base value is x0a, indirection logic circuits 446 can forward third degree Taylor series coefficient $F^3(x0a)/6$ as input parameter 492b, second degree Taylor series coefficient $F^2(x0a)/2$ as input parameter 492c, first degree Taylor series coefficient $F^1(x0a)$ as input parameter 492e, and function value F(x0a) as input parameter 492g. By setting input parameters 492a-492g, arithmetic circuits 448 can approximate the value of applying F(x) on an input based on a third degree Taylor series expansion as described in Equation 7.

Figure 5B:
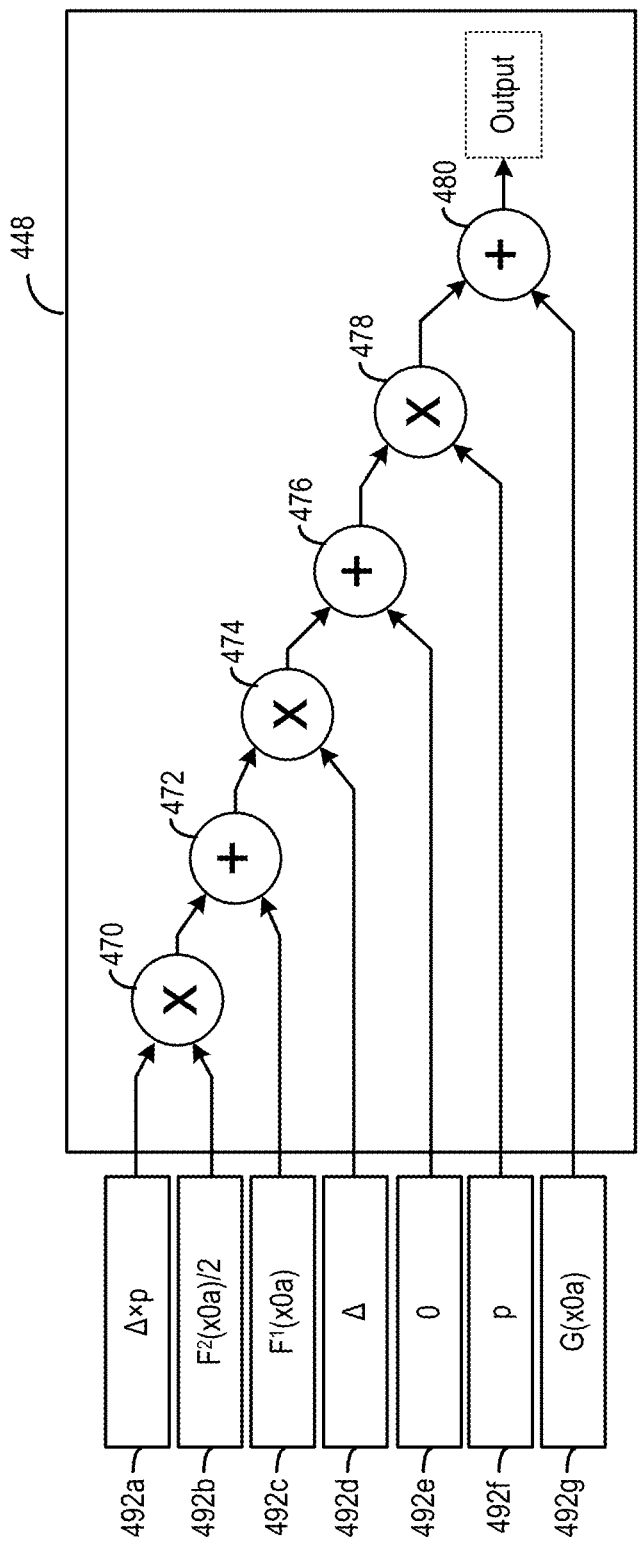

FIG. 5B illustrates an example of input parameters 492a-492g provided to arithmetic circuits 448 to compute parametric portion 332 of parametric sigmoid function G(x). Assuming the closest base value to input is x0a, the input parameters can configure arithmetic circuits 448 to perform a second degree Taylor series expansion of G(x) using Taylor series coefficients of F(x) and scaling the coefficients with the parameter p, based on the following equation:

$$\text{Approx. } G(\text{input}) = G(x0a) + \left(\frac{F^2(x0a)}{2} \times \Delta \times p + F^1(x0a)\right) \times \Delta \times p \quad \text{(Equation 11)}$$

Equation 11 can be derived based on that a first derivative of G(x) can be obtained by scaling the first derivative of F(x) ($F^1(x)$) using parameter p, and that a second derivative of G(x) can be obtained by scaling the second derivative of F(x) ($F^2(x)$) using a square of p ($p^2$).

To perform the computations according to Equation 11, indirection logic circuits 446 can forward the product Δxp as input parameter 492a, second degree Taylor series coefficient $F^2$(x0a)/2 as input parameter 492b, first degree Taylor series coefficient $F^1$(x0a) as input parameter 492c, difference Δ as input parameter 492d, zero as input parameter 492e, parameter p as input parameter 492f, and function value G(x0a) as input parameter 492g. Indirection logic circuits 446 may receive product Δxp, parameter p, as well as function value G(x0a) from computation controller 434 as part of first function parameters 460. Indirection logic circuits 446 may also receive first degree Taylor series coefficient $F^1$(x0a) and second degree Taylor series coefficient $F^2$(x0a)/2 from a bucket of input mapping table 442 selected based on the input, which also stores an indication that the base value x0a corresponds to parametric portion 332 of parametric sigmoid function G(x). Based on the indication, indirection logic circuits 446 can forward product Δxp, parameter p, as well as function value G(x0a) from computation controller 434 to arithmetic circuits 448 to perform the computation.

Figure 5C:
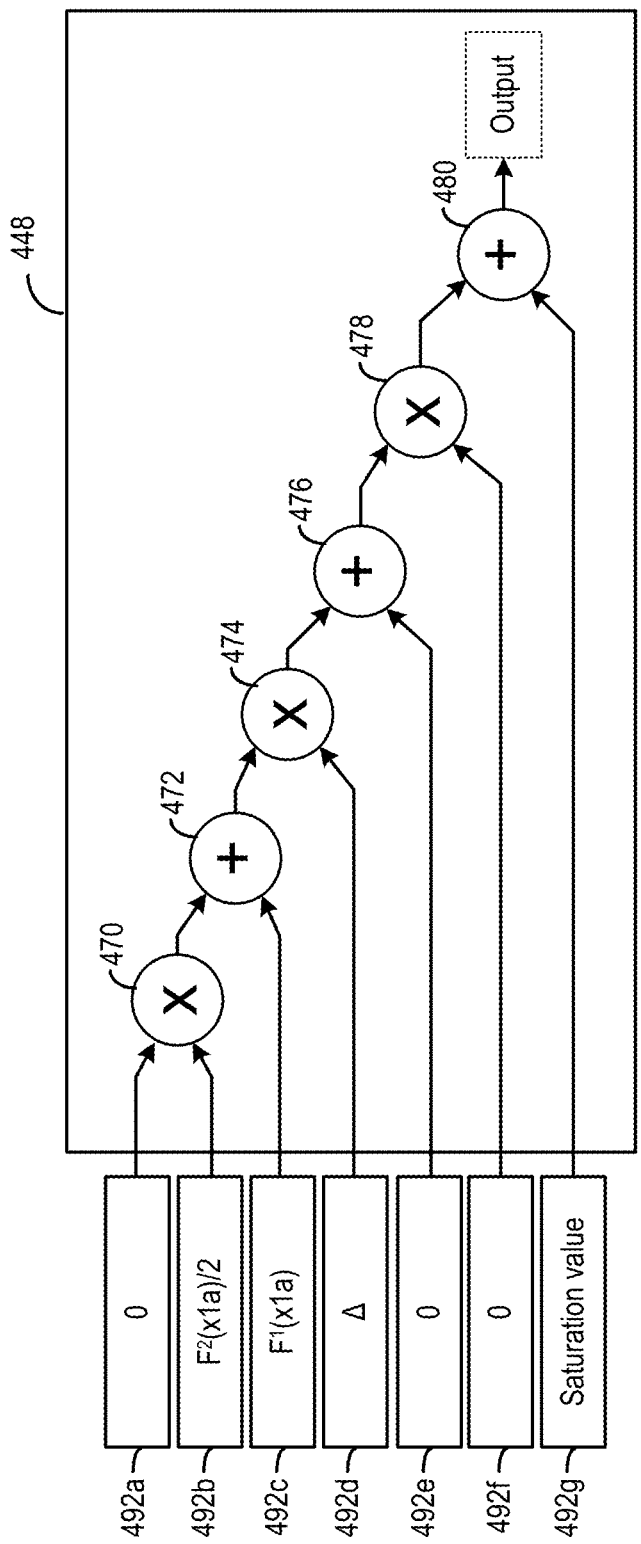

FIG. 5C illustrates another example of input parameters 492a-492g provided to arithmetic circuits 448 to compute a non-parametric portion 332 of parametric sigmoid function G(x). In FIG. 5C, the closest base value to the input is x1a, and the bucket of base value x1a may store an indication that the base value x1a corresponds to non-parametric portion 334a of the function. Based on the indication, indirection logic circuits 446 may obtain second function parameters 462 from function profile table 444 and forward second function parameters 462 to arithmetic circuits 448. Second function parameters 462 may set a zero for input parameter 492a (instead of Δxp in FIG. 5B), a zero for input parameter 492f (instead of parameter p in FIG. 5B), and a saturation value (e.g., −1 for non-parametric portion 334a) instead of function value G. With such arrangements, the output of arithmetic circuits 448 can become equal to the saturation value of G(x).

Figure 5D:
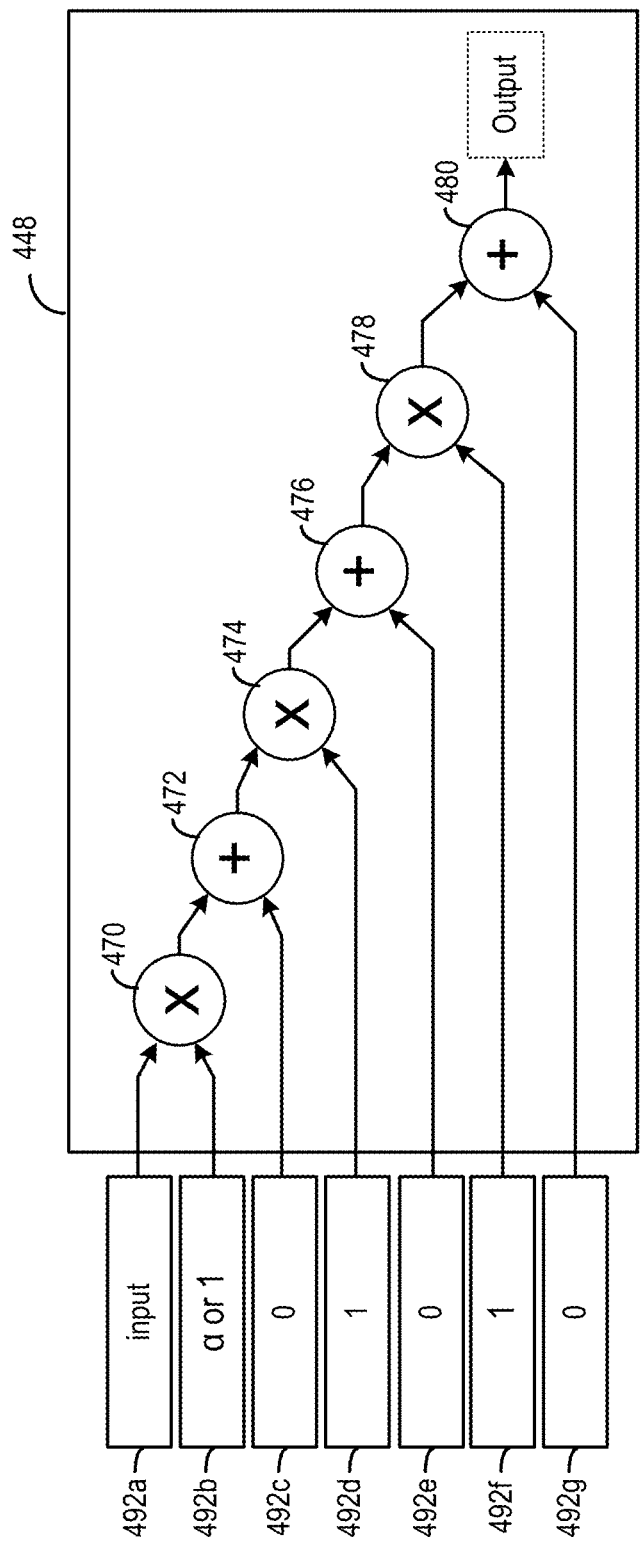

FIG. 5D illustrates another example of input parameters 492a-492g provided to arithmetic circuits 448 to compute parametric ReLU function H(x). Indirection logic circuits 446 can forward the input (or the base value of a bucket of input mapping table 442 closest the input) as input parameter 492a, zeros for input parameters 492c, 492e, and 492g, and one for input parameters 492d and 492f. For input parameter 492b, indirection logic circuits 446 may forward scaling factor α received from computation controller 434 as part of first function parameters 460, or one received from function profile table 444. The selection can be based on an indication stored from the bucket of input mapping table 442 which indicates whether the input (or the base value) corresponds to the parametric or non-parametric portions of H(x). If the input corresponds to the parametric portion of H(x), indirection logic circuits 446 may forward scaling factor α as input parameter 492b, which enables first multiplier 470 to multiply the input (or the base value) with the scaling factor to approximate the parametric portion. If the input corresponds to the non-parametric portion of H(x), indirection logic circuits 446 may forward one as input parameter 492b, and arithmetic circuits 448 can output the received input (or base value) according to the non-parametric portion of H(x).

Figure 5E:
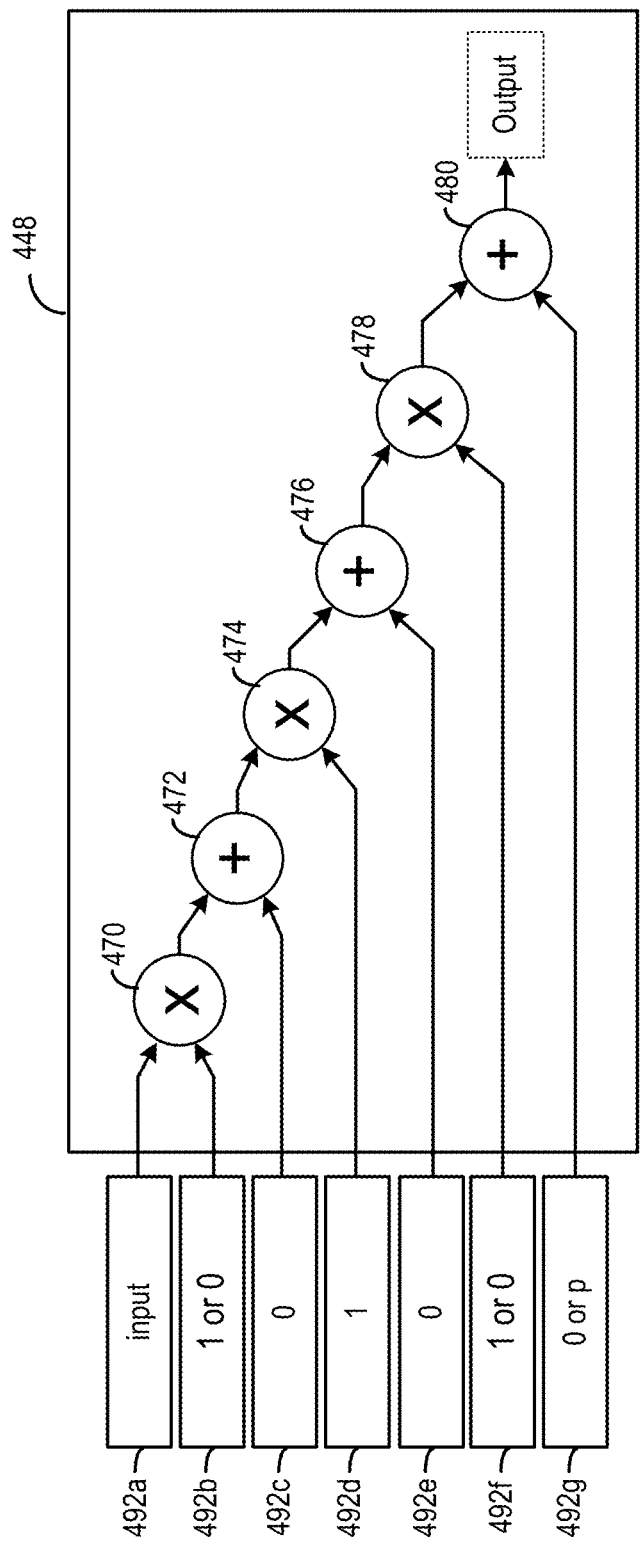

FIG. 5E illustrates another example of input parameters 492a-492g provided to arithmetic circuits 448 to compute parametric capped ReLU function K(x). Indirection logic circuits 446 can forward the input (or the base value of a bucket of input mapping table 442 closest the input) as input parameter 492a, zeros for input parameters 492c and 492e, and one for input parameter 492d. Indirection logic circuits 446 can forward one or zero from function profile table 444 as input parameter 492b to enable first multiplier 470 to output zero (for negative input) or to scale the input with one (for non-negative input, up to the capped parameter value). Indirection logic circuits 446 can also forward one from function profile table 444 as input parameter 492f and zero from function profile table 444 as input parameter 492g, such that the arithmetic circuits output a zero or the input for the non-parametric portion of K(x). Moreover, if the indication in the bucket signals that the input corresponds to the parametric portion of K(x), indirection logic circuits 446 can receive a parameter cap value p from computation controller 434, and forward zero as input parameter 492f and cap value p as input parameter 492g to arithmetic circuits 448, such that arithmetic circuits 448 can output the cap value p according to the parametric portion of K(x).

Figure 6:
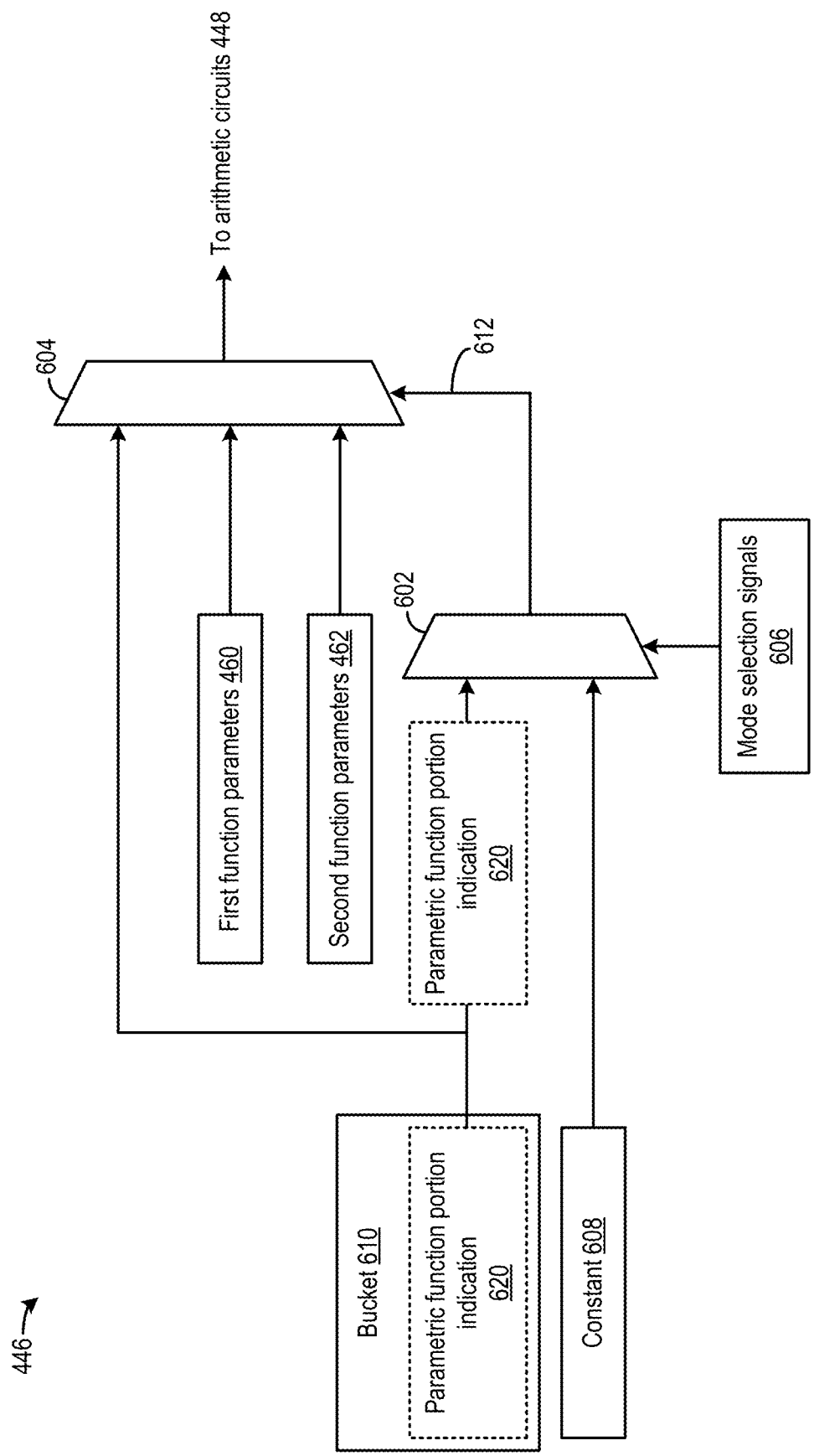
FIG. 6 illustrates an example of an internal component of the activation function engine of FIGS. 4A-4B, according to certain aspects of the present disclosure.

FIG. 6 illustrates an example of internal components of indirection logic circuits 446. As shown in FIG. 6, indirection logic circuits 446 include a first multiplexor 602 and a second multiplexor 604. First multiplexor 602 may receive mode selection signals 606 which indicate, for example, whether activation function engine 430 operates in a first mode to approximate a non-parametric activation function, or in a second mode to approximate a parametric activation function. First multiplexor 602 can receive a bucket selection signal 608 and a bucket 610 of input mapping table 442, and select between bucket selection signal 608 or content of bucket 610 as output. The output of first multiplexor 602 can control selection signals 612 of second multiplexor 604. Second multiplexor 604 may receive bucket 610, first function parameters 460, and second function parameters 462, and forward one of them to arithmetic circuits 448 based on selection signals 612.

In the first mode of operation, mode selection signals 606 can control first multiplexor 602 to forward bucket selection signal 608 as selection signals 612 of second multiplexor 604. Based on receiving bucket selection signal 608, second multiplexor 604 can forward the content of bucket 610 as part of input parameters 492a-492g of arithmetic circuits 448. As described above, in the first mode of operation bucket 610 may store function parameters of a non-parametric function (e.g., slopes, Taylor series coefficients, etc.), which enables arithmetic circuits 448 to perform extrapolation operations as described in, for example, FIG. 5A.

In the second mode of operation, mode selection signals 606 can control first multiplexor 602 to forward at least part of the content of bucket 610 to second multiplexor 604 as selection signals 612. In the second mode of operation, bucket 610 may store parametric function portion indication 620 which can indicate, for example, whether the base value of the bucket corresponds to a parametric portion or a non-parametric portion of a parametric activation function. Indication 620 may further signal that the base value corresponds to a sub-portion of the non-parametric portion (e.g., whether the base value corresponds to parametric portions 334a or 334b of G(x), whether the base value corresponds to negative portion of K(x) or the non-negative portion of K(x) up to the capped value, etc.). Indication 620 can be used to control mode selection signals 606 to forward one of first function parameters 460 (for parametric portion) or second function parameters 462 (for non-parametric portion) as part of input parameters 492a-492g to arithmetic circuits 448. Although not shown in FIG. 6, it is understood that second multiplexor 604 can also selectively forward bucket 610 in the second mode of operation to support scaling of Taylor series coefficients using first function parameters 460 as described in FIG. 5B.

Figure 7:
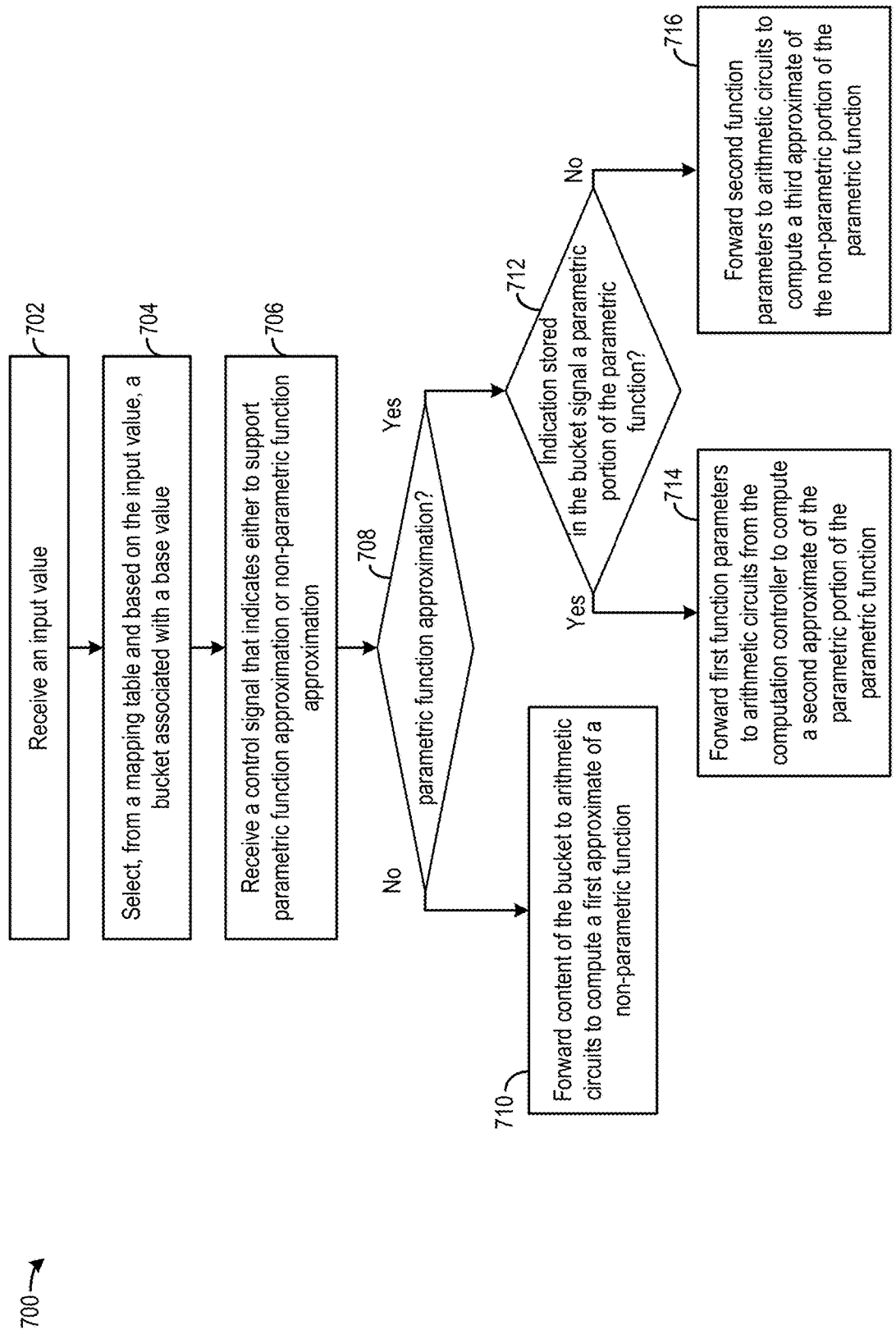
FIG. 7 illustrates a flowchart of an example method of neural network processing, according to certain aspects of the present disclosure.

FIG. 7 illustrates an example flow diagram of a process 700 for performing hardware-based mathematical function processing. Process 700 can be performed by, for example, various internal components of neural network processor 402 as described in FIG. 4A-FIG. 6 including, for example, activation function engine 430, and may include the techniques described above.

At operation 702, activation function engine 430 receives an input for activation function processing. The input may be intermediate output received from output buffer 428.

At operation 704, activation function engine 430 selects, from a mapping table and based on the input value, a bucket associated with a base value. The bucket can be selected based on identifying a base value closest to the input value. The mapping table can include input mapping function table 442 and include a set of buckets, with each bucket being associated with a base value. The content of the buckets may vary based on an operation mode of activation function engine 430. In the first mode of operation to approximate a non-parametric activation function, each bucket of the mapping table may store a set of function parameters associated with the base value. The set of function parameters may include a function value obtained by evaluating the activation function at the base value. The set of function parameters may also include Taylor series expansion coefficients, or other function parameters for performing an extrapolation operation. In the second mode of operation to approximate a parametric activation function, each bucket of the mapping table may store an indication of a parametric function portion (e.g., parametric function portion indication 620) which can signal, for example, whether the base value of the bucket corresponds to a parametric portion or a non-parametric portion of a parametric activation function. The indication may further signal that the base value corresponds to a sub-portion of the non-parametric portion of the parametric activation function.

At operation 706, activation function engine 430 receives a control signal that indicates either the first mode of operation (to approximate a non-parametric function) or the second mode of operation (to approximate a parametric function). The control signal may be received from computation controller 434.

At operation 708, activation function engine 430 determines whether the control signal indicates the first mode or second mode of operations. If the control signal indicates the first mode of operation (at operation 708), activation function engine 430 can forward the content of the bucket to arithmetic circuits 448 to compute a first approximation of the non-parametric function, at operation 710. The computation can be based on the extrapolation operation as described in, for example, FIG. 5A.

If the control signal indicates the second mode of operation (at operation 708), activation function engine 430 can determine a portion of the parametric activation function based on the indication stored in the bucket, at operation 712. If the indication signals the parametric portion is to be approximated (at operation 712), activation function engine 430 can forward first function parameters (which can be received from computation controller 434) to arithmetic circuits 448 to compute a second approximation of the parametric portion of the parametric activation function, at operation 714. If the indication signals the non-parametric portion is to be approximated (at operation 712), activation function engine 430 can forward second function parameters (which can be received from function profile table 444 and/or from the bucket) to arithmetic circuits 448 to compute a third approximation of the non-parametric portion of the parametric activation function, at operation 716, based on the techniques described in, for example, FIGS. 5B-5E.

Figure 8:
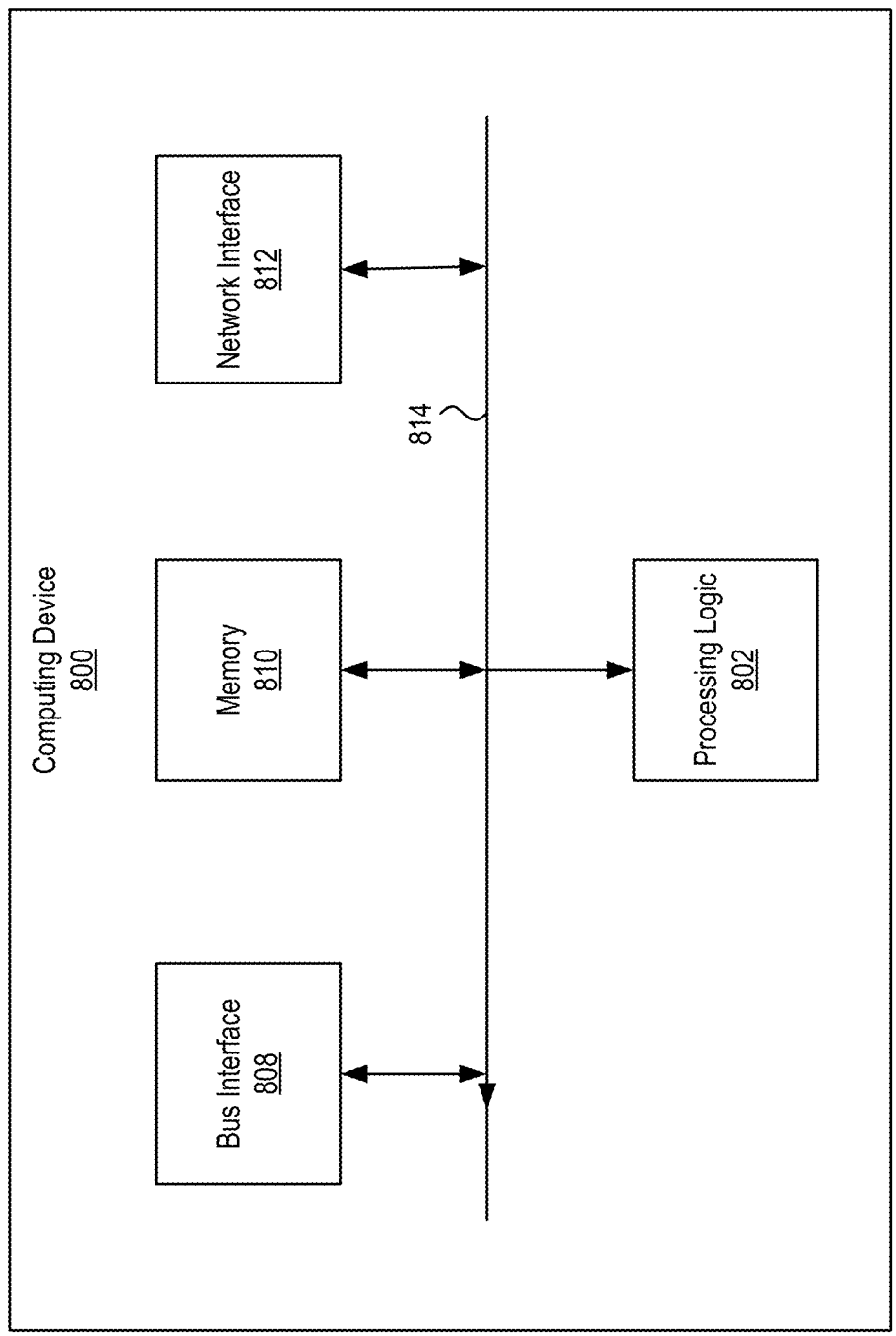
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with provision of an image recognition service) can be allocated to a client upon request.

In one example, the computing device 800 may include processing logic 802, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810. Processing logic 802 may also include hardware circuities for performing artificial neural network computation including, for example, neural network processor(s) 402, etc.

The access to processing logic 802 can be granted to a client to provide the personal assistant service requested by the client. For example, computing device 800 may host a virtual machine, on which an image recognition software application can be executed. The image recognition software application, upon execution, may access processing logic 802 to predict, for example, an object included in an image. As another example, access to processing logic 802 can also be granted as part of bare-metal instance, in which an image recognition software application executing on a client device (e.g., a remote computer, a smart phone, etc.) can directly access processing logic 802 to perform the recognition of an image.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory 810 may also store, for example, software applications for performing artificial neural network computation. For example, memory 810 may store software routines related to the computations of the equations above. In a case where processing logic 802 is in the form of FPGA, memory 810 may store netlists data representing various logic circuit components of processing logic 802. In some examples, memory 810 can include memory 412.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 1012 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some embodiments, computing device 800 may receive a set of parameters, such as the aforementioned weight vectors for generation of forget gate factor, input factor, output factor, etc. from a server through network interface module 812.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
a hardware mapping table, the hardware mapping table comprising a plurality of buckets, each bucket of the plurality of buckets configured to:
in a non-parametric function mode, store a first base value and a plurality of parameters of a non-parametric function evaluated at the first base value; and
in a parametric function mode, store a second base value and a parametric function portion indication of a parametric function associated with the second base value;

indirection logic circuits configured to, based on a control signal indicating the parametric function mode or the non-parametric function mode, forward either a plurality of parameters of the non-parametric function from a bucket, or function parameters of the parametric function, the function parameters being selected based on the parametric function portion indication stored in the bucket; and
arithmetic circuits configured to:
receive, from the indirection logic circuits, either the plurality of parameters of the non-parametric function, or the function parameters of the parametric function; and
compute either a first approximation of the non-parametric function or a second approximation of the parametric function.

2. The integrated circuit of claim 1, wherein the indirection logic circuits are configured to receive at least first function parameters of the function parameters via an instruction from an application.

3. The integrated circuit of claim 2, further comprising a function profile table configured to store second function parameters of the function parameters; and
wherein the indirection logic circuits are configured to receive the second function parameters from the function profile table.

4. The integrated circuit of claim 1, wherein the parametric function includes a parametric rectified linear unit (ReLu) function comprising a non-parametric function portion and a parametric function portion;
wherein the non-parametric function portion corresponds to non-negative input values; and
wherein the parametric function portion corresponds to negative input values.

5. A system comprising:
a hardware mapping table;
a control circuit; and
arithmetic circuits,
wherein the control circuit is configured to:
in a first mode of operation, forward a set of parameters of a non-parametric function associated with an input value from the hardware mapping table to the arithmetic circuits to compute a first approximation of the non-parametric function at the input value; and
in a second mode of operation, based on information indicating whether the input value is in a first input range or in a second input range of the hardware mapping table, forward a first parameter or a second parameter of a parametric function to the arithmetic circuits to compute, respectively, a second approximation or a third approximation of the parametric function at the input value.

6. The system of claim 5, wherein the arithmetic circuits comprise a multiplier and an adder, the multiplier configured to compute a multiplication result and the adder configured to compute an addition result based on the multiplication result.

7. The system of claim 6, wherein the set of parameters of the non-parametric function comprises a set of Taylor series coefficients of the non-parametric function evaluated at a base value; and
wherein the control circuit is configured to:
forward a first Taylor series coefficient to the multiplier to multiply with a difference between the base value and the input value to generate the multiplication result; and forward a second Taylor series coefficient to the adder to add to the multiplication result to compute the addition result for the first approximation.

8. The system of claim 7, wherein the control circuit is configured to:
forward the first parameter or the second parameter to the multiplier to multiply with the input value to compute, respectively, the second approximation or the third approximation of the parametric function at the input value.

9. The system of claim 6, wherein the control circuit is configured to:
in the second mode of operation, based on whether the input value is in the first input range, in the second input range, or in a third input range, forward the first parameter, the second parameter, or a third parameter of the parametric function to the arithmetic circuits to compute, respectively, the second approximation, the third approximation, or a fourth approximation of the parametric function at the input value.

10. The system of claim 9, wherein the control circuit is configured to forward a zero value to the multiplier and to forward the third parameter to the adder.

11. The system of claim 5, wherein the hardware mapping table comprises a plurality of buckets, each bucket of the plurality of buckets configured to:
in the first mode of operation, store a base value and the set of parameters of the non-parametric function evaluated at the base value; and
in the second mode of operation, store the base value and an indication of an input range of the base value; and
wherein the control circuit is configured to select a bucket from the plurality of buckets based on a difference between the input value and the base value stored in the selected bucket.

12. The system of claim 11, wherein the control circuit is configured to:
in the first mode of operation, forward the set of parameters of the non-parametric function stored in the selected bucket to the arithmetic circuits; and
in the second mode of operation, based on the indication of the input range of the base value stored in the selected bucket, forward the first parameter or the second parameter of the parametric function to the arithmetic circuits.

13. The system of claim 12, wherein the control circuit comprises a first multiplexor and a second multiplexor, the first multiplexor configured to control the second multiplexor;
wherein the first multiplexor is configured to select, based on a control signal indicating the first mode of operation or the second mode of operation, between forwarding a constant selection signal or the indication of the input range as a selection signal to the second multiplexor; and
wherein the second multiplexor is configure to select, based on the selection signal, content of the selected bucket, the first parameter, or the second parameter for forwarding to the arithmetic circuits.

14. The system of claim 5, wherein the control circuit is configured to receive the first parameter from an application that interfaces with the system.

15. The system of claim 5, wherein the control circuit is configured to receive the second parameter from a profile table associated with the parametric function.

16. The system of claim 5, wherein the control circuit is configured to receive the second parameter from the selected bucket.

17. The system of claim 5, wherein the parametric function comprises a parametric rectified linear unit (ReLu) function, a capped ReLu function, or a parametric sigmoid function.

18. A method, comprising:
receiving an input value;
selecting, from a mapping table and based on the input value, a bucket associated with a base value;
receiving a control signal that indicates either to support parametric function approximation or non-parametric function approximation; and
based on the control signal, either:
forwarding content of the bucket to arithmetic circuits to compute an approximation of a non-parametric function, or
forwarding, based on the input value, function parameters to the arithmetic circuits to compute an approximation of a parametric function.

19. The method of claim 18, wherein the function parameters comprise first function parameters of a parametric portion of the parametric function, or second function parameters of a non-parametric portion of the parametric function.

20. The method of claim 19, wherein forwarding, based on the input value, function parameters to the arithmetic circuits to compute an approximation of the parametric function comprises:
obtaining an indication from the bucket that signals either the base value corresponds to the parametric portion or to the non-parametric portion of the parametric function; and
based on the indication, forwarding the first function parameters or the second function parameters to the arithmetic circuits.

* * * * *